June 3, 1958  L. E. SODERQUIST  2,836,847
TIRE LIFTING MECHANISM FOR DUAL VULCANIZING PRESSES
Filed July 24, 1957  4 Sheets-Sheet 1

FIG. I

INVENTOR.
LESLIE E. SODERQUIST
BY Ely, Frye & Hamilton
ATTORNEYS

June 3, 1958 L. E. SODERQUIST 2,836,847
TIRE LIFTING MECHANISM FOR DUAL VULCANIZING PRESSES
Filed July 24, 1957 4 Sheets-Sheet 3

INVENTOR.
LESLIE E. SODERQUIST
ATTORNEYS

June 3, 1958   L. E. SODERQUIST   2,836,847
TIRE LIFTING MECHANISM FOR DUAL VULCANIZING PRESSES
Filed July 24, 1957   4 Sheets-Sheet 4
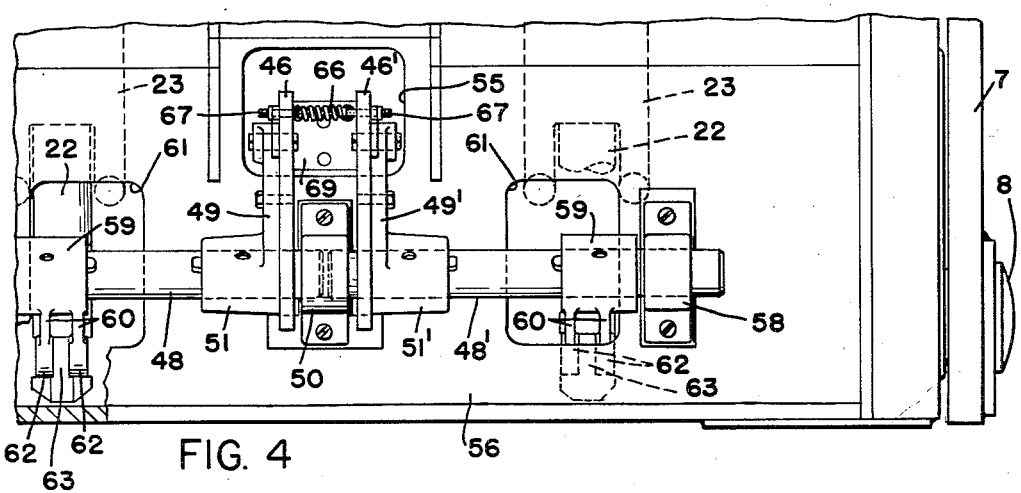
FIG. 4
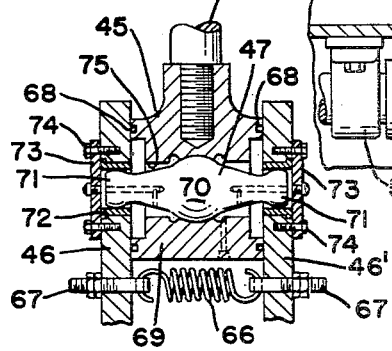
FIG. 7
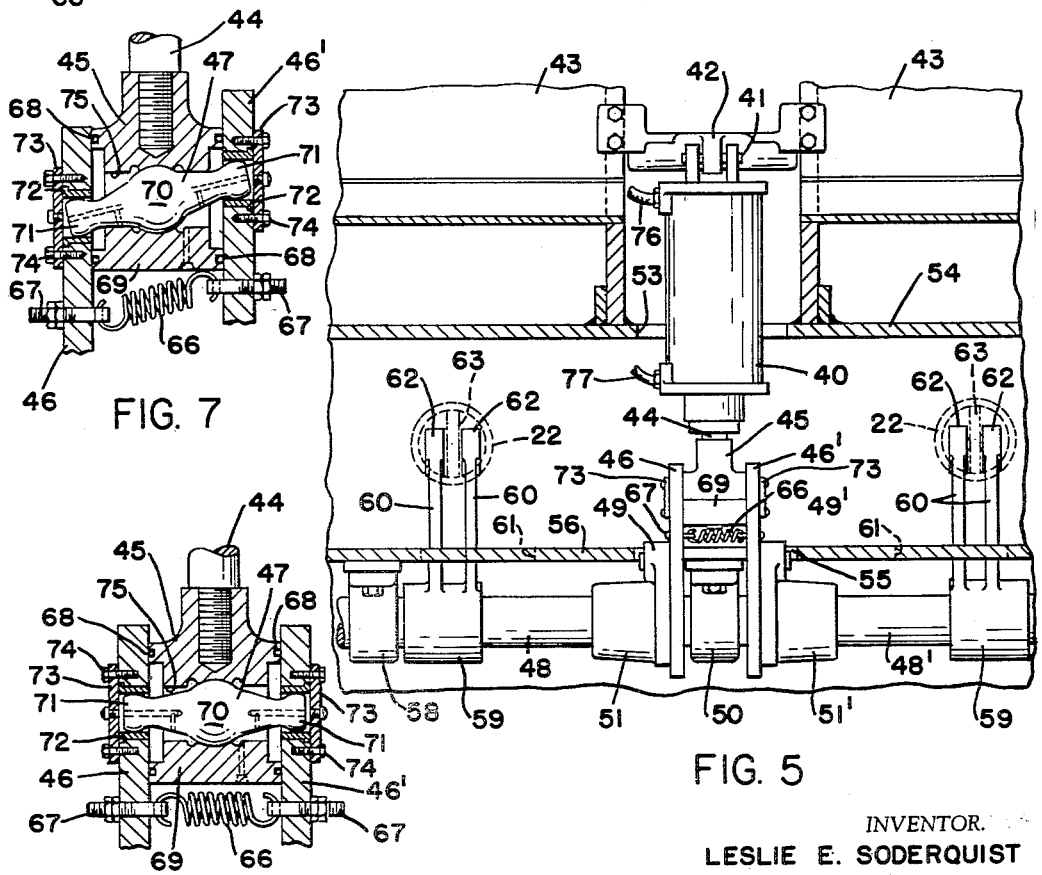
FIG. 6
FIG. 5
INVENTOR.
LESLIE E. SODERQUIST
BY Ely, Fryer & Hamilton
ATTORNEYS

United States Patent Office 2,836,847
Patented June 3, 1958

2,836,847

TIRE LIFTING MECHANISM FOR DUAL VULCANIZING PRESSES

Leslie E. Soderquist, Silver Lake, Ohio, assignor to The McNeil Machine & Engineering Company, Akron, Ohio, a corporation of Ohio Application July 24, 1957, Serial No. 673,920

12 Claims. (Cl. 18—2)

The invention relates to apparatus for removing cured tires from vulcanizing presses, and more particularly to improved means for simultaneously elevating the two tires above the lower mold sections of a dual press after the press is opened.

The mechanism of the present invention is shown embodied in a press utilizing two diaphragms as a permanent part of the press for forming the tires during curing, but the mechanism may be applied to presses employing forming mechanism other than the diaphragms. For example, in curing tubeless tires, the diaphragms may be omitted and rings acting on the inner surfaces of the tire beads hold the tires as the shaping and curing medium is brought into direct contact with the tires. Accordingly, the term "forming mechanism" as used in the specification and claims is intended to cover presses with or without diaphragms, the improved lifting mechanism of the present invention being adapted to separate the cured tires from the lower molds of the opened press by elevating the tires above the lower mold sections.

The mold opening and closing mechanism may vary, and there is shown generally herein that type of mechanism in which the path of the upper mold sections is vertical during the first portion of the opening movement and during the last part of the closing movement, and during the remainder of the opening and closing movement the upper mold sections swing away from the cured tires and the forming mechanism therefor. A press of this type is shown in applicant's prior copending applications Serial No. 416,598, filed March 16, 1954.

In presses of this type, after the press is opened the cured tires are raised above the lower mold sections by elevating the rings or plates which support the bead rings of the tire during the curing operation. Heretofore, individual elevating mechanism has been required for each tire because widely different amounts of force are usually required to free the two tires from their lower mold sections, and this condition is especially true when two different sizes of tires are cured in a dual press.

The purpose of the present invention is to provide improved mechanism for compensating for unequal resistance of the mold sections to elevation of the respective tires therefrom, so that one power elevating means can be used for both tires. The improved mechanism is designed to allow the mold section offering the lesser resistance to free first, and then to apply full power to free the other mold section.

Other objects are to provide a simple, compact and economical tire lifting mechanism for a dual press.

These and other objects are accomplished by providing an equalizer lever arrangement between the two tires and a single power elevating means whereby when one tire has been freed from its lower mold section, the full power of the elevating means will be applied to the other tire. Various modifications and changes in details of construction are covered within the scope of the appended claims. A preferred embodiment of the best known mode of carrying out the invention is shown by way of example in the accompanying drawings and described in detail herein.

In the drawings:

Fig. 4 is a fragmentary front elevation, partly in section, of the lower part of the press, showing the tire elevating mechanism.

Fig. 5 is a fragmentary plan sectional view as on line 5—5 of Fig. 2.

Fig. 6 is a sectional view, taken on line 6—6 of Fig. 2, of the equalizer lever mechanism connecting the piston of the elevating cylinder to the rocker shafts which elevate the bead rings supporting the tires, the equalizer lever being shown in neutral position.

Fig. 7 is a similar view, showing the equalizer lever tilted in one direction to its extreme position.

Figure 1:
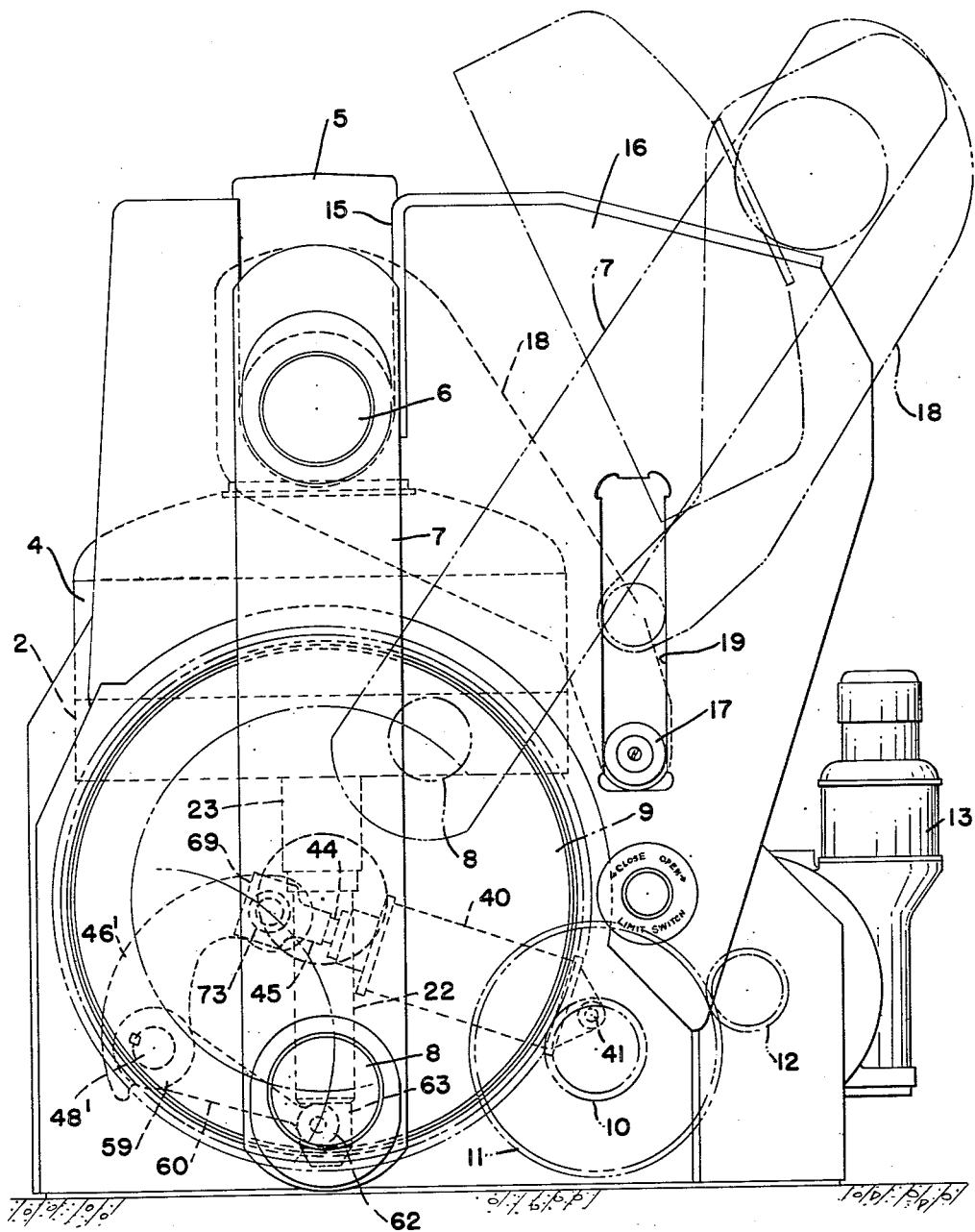
Fig. 1 is a side elevation of a press in closed position embodying the invention, the open position of the press being indicated in chain lines.
Figure 2:
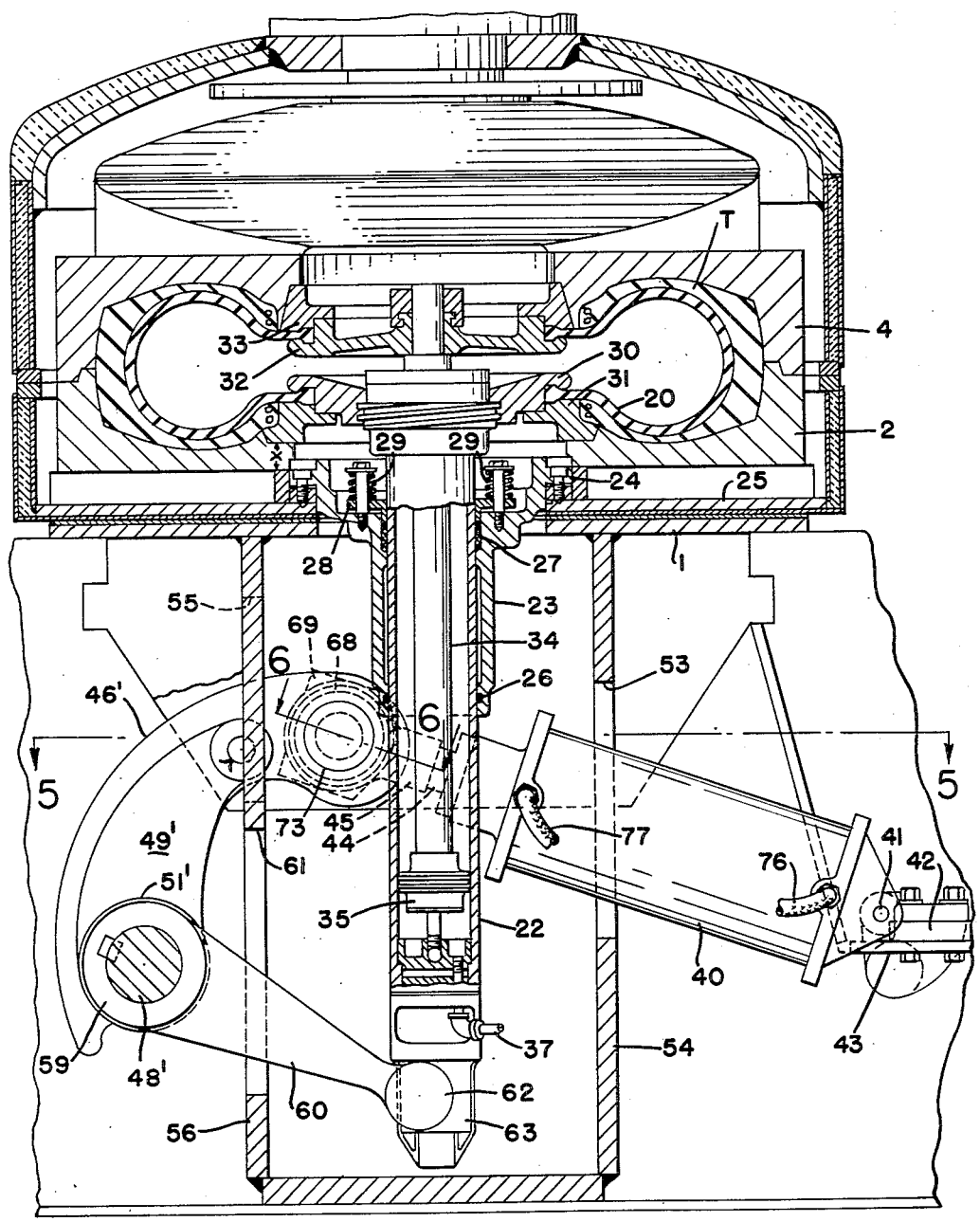
Fig. 2 is a vertical sectional view of the press in closed position.
Figure 3:
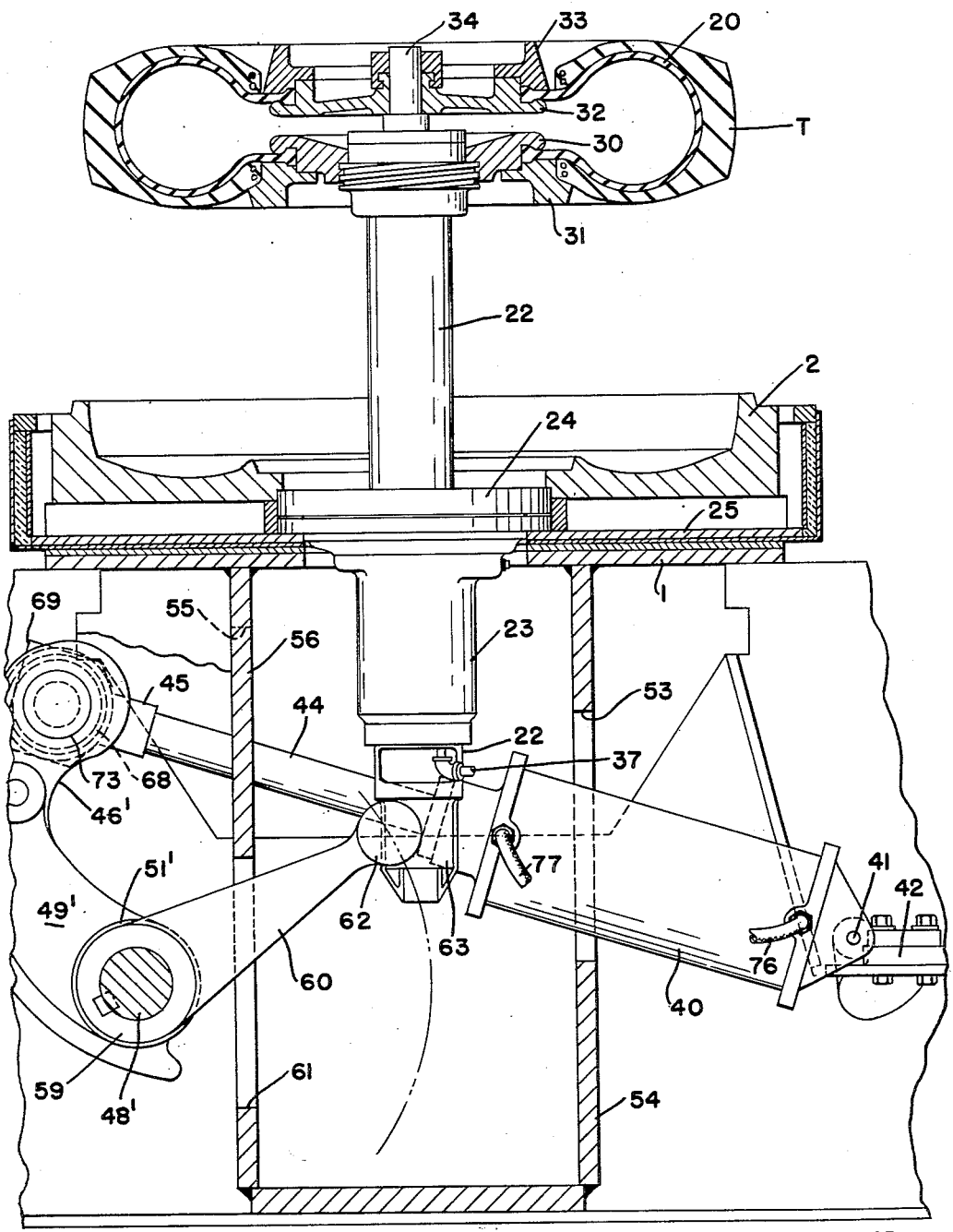
Fig. 3 is a similar view, showing the press open and one of the tires elevated above the lower mold section.

Referring to Figs. 2 and 3, the bed 1 of the press supports the lower mold section 2 which may be chambered for the circulation of steam therein. The upper chambered mold section 4 is carried by a cross beam 5 (Fig. 1), which is raised and lowered by mechanism such as shown in said prior application Serial No. 416,598. The beam 5 extends across the press and at each end is provided with a heavy trunnion 6 which is rotatably mounted in a bearing in the upper end of a vertical link 7.

The links 7 are pivotally mounted at their lower ends on trunnions 8 formed on large bull gears 9 in the base of the press. The bull gears 9 are driven by suitable gearing indicated at 10, 11 and 12 from the reversible motor 13 at the rear of the press.

The trunnions 6 are guided in vertical slots 15 in side plates 16 on either side of the press, during the first part of the mold opening movement and the last part of the mold closing movement. As the upper mold sections swing laterally during the remaining part of the movement, the trunnions 6 roll over the top edges of the side plates 16 and are guided by rollers 17 mounted on trunnions arms 18 and rolling in slots 19 in the side plates 16.

After the tires T have been cured in the closed press, as shown in Fig. 2, and the press has been opened by raising the upper mold sections, the means supporting the two diaphragms 20 are raised to strip the tires from the lower mold sections, as shown in Fig. 3. The mechanism for raising the diaphragm supporting means preferably includes a cylinder 22 vertically slidable in an outer cylinder 23 depending from each lower mold section 2. Each outer cylinder 23 has an annular flange 24 supported on the bottom plate 25 on which the lower mold section is supported. A suitable sealing ring 26 is provided within the lower end of the outer cylinder 23 and engaging cylinder 22, and within the upper end of cylinder 23 packing 27 is yieldingly compressed by a jamb ring 28 urged by compression springs 29.

The upper end of cylinder 22 is threaded into the lower diaphragm plate 30 which clamps the lower bead of the diaphragm 20 against the lower bead ring 31 of the tire, so that cylinder 22 constitutes a lifting element to lift the tire out of its lower mold section. The upper bead of the diaphragm is clamped between the uper diaphragm plate 32 and the upper bead ring 33. The upper diaphragm plate 32 is secured to the upper end of a piston rod 34 attached at its lower end to a piston 35 slidable in the cylinder 22, so that when the tire has been stripped from the lower mold section by elevating the cylinder 22, as in Fig. 3, pressure fluid admitted through pipe 37 at the lower end of cylinder 22 will elevate the piston 35 and with it the upper diaphragm plate 32 to strip the diaphragm from the tire.

In prior presses of this type, such as the one shown in said application Serial No. 416,598 for example, individual mechanisms have been required for raising the two diaphragms to strip the tires from their lower mold sections. This is because the resistance of the two mold sections to the stripping action is never the same, particularly where two tires of different sizes are cured, and the indvidual elevating mechanisms permit the full force of each mechanism to be applied to free each tire. A single mechanism of this type would have to be powerful enough to free both tires simultaneously.

According to the present invention, a single hydraulic cylinder 40 at the central part of the press operates two transverse rocker shafts which have lever arms for elevating both diaphragm cylinders 22. Referring to Figs. 2 and 5, the rear end of the cylinder 40 is pivoted at 41 on a bracket 42 supported on cross plates 43 of the press, and the piston rod 44 or thrust element of the cylinder has a head 45 at its outer end which is slidably and rotatably connected between the upper ends of two parallel lever arms 46 and 46' by means of a tilting compensating shaft 47 shown in Figs. 6 and 7.

The lower ends of the two arms 46 and 46' are secured one on each of two aligned rocker shafts 48 and 48', the inner ends of which substantially abut as shown in Fig. 4 and are journaled in a common bearing 50 secured on the frame between the arms 46 and 46'. As shown, the arms 46 and 46' are made in two parts 46 and 49 and 46' and 49' secured together, but this is for the purpose of facilitating disassembly of the cylinder, and during normal operation the two parts operate as a single arm. The parts 49 and 49' have hubs 51 and 51' which are keyed on the respective rocker shafts 48 and 48'.

The front end of cylinder 40 passes through an opening 53 in a transverse vertical plate 54 of the press frame passing to the rear of the lifting cylinders 22, and in the closed position of the press the lever arms 46 and 46' extend forwardly through a central opening 55 in a transverse vertical plate 56 of the press frame passing in front of the cylinders 22, and behind the rocker shafts 48 and 48'.

The outer ends of the rocker shafts 48 and 48' are journaled in bearings 58 on the front plate 56, and on each shaft adjacent the bearing 58 is secured a hub 59 from which a pair of laterally spaced rocker arms 60 extend rearwardly through openings 61 in the front plate 56. Each pair of arms 60 is spaced apart laterally so that their rounded rear ends 62 straddle a vertical web 63 in the lower end of cylinder 22 and are slidably and rotatably received in the socket openings formed on either side of the web.

Referring to Figs. 6 and 7, the upper ends of lever arms 46 and 46' are held in sliding abutment with the opposite sides of the head 45 by a tension spring 66 attached at its ends to eyebolts 67 in the arms adjacent to the head. Sealing rings 68 are preferably provided in the side faces of the head abutting the lever arms to provide a lubricant seal for the compensating shaft 47. The head 45 is of split construction, having a front portion 69 bolted thereto for assembly purposes.

The compensating shaft 47 has an enlarged spherical central portion 70 forming a universal ball joint with a spherical socket formed by the head 45 and its front plate 69. The outer ends 71 of shaft 47 are rounded and journaled for universal movement in bushings 72 in the arms 46 and 46', and cap plates 73 close the outer ends of the bushings and are secured to the arms by screws 74. The socket for the ball portion 70 is formed at the central part of a transverse bore 75 in the head which surrounds and is radially spaced from the tapered shaft portions between the ball 70 and the outer ends 71.

In the operation of the improved mechanism, after the tires are cured and the press is opened, pressure fluid is admitted to the cylinder 40 through conduit 76 and exhausted from the other end of the cylinder through conduit 77, moving piston rod 44 from the position of Fig. 2 to the position of Fig. 3. This action rotates the rocker shafts 51 and 51' and causes the rear ends 62 of lever arms 60 to lift the cylinder 22, carrying with it the diaphragms 20 and stripping the tires T from the lower mold sections 2.

Referring to Fig. 7, if for example the tire elevated by rocker shaft 48' requires more force to free it from its lower mold section than the other tire, the compensating shaft 47 tilts on its spherical portion 70 and allows arm 46 to move forward relative to arm 46' until the tapered portion of the shaft adjacent to arm 46' abouts the bore 75. During this relative movement the other tire elevated by arm 46 and rocker shaft 48 is freed from its lower mold section, so that substantially the full power of cylinder 40 is then applied to arm 46' to free the tire elevated by shaft 48' from its lower mold section.

The improved compensating mechanism accordingly permits the use of a single operating cylinder for elevating both diaphragms to strip two cured tires from their lower mold sections, without materially increasing the size of cylinder required for elevating each of the two diaphragms, because substantially the full force of the single cylinder is applied to each tire to free it from its lower mold section. Moreover, two tires of different sizes can be cured in the same press, since the compensating mechanism permits relative movement between the two elevating mechanisms to compensate for dimensional differences in the mold sections.

What is claimed is:

1. In a press for curing two tires in side-by-side relationship in sectional molds comprising a lower mold section for each tire, and vertically movable lifting elements extending through said lower mold sections and detachably secured to the tires therein, improved mechanism for elevating said lifting elements to strip the cured tires from their lower mold sections, said mechanism including a rocker shaft for each tire, rocker arms pivotally connecting said rocker shafts to said lifting elements, a pair of parallel lever arms secured one to each rocker shaft, a single operating cylinder having a piston for actuating said lever arms, and a transverse compensating shaft having its central portion universally connected to said piston and its ends universally connected to said lever arms, for permitting limited relative movement of the lever arms when actuated by said piston.

2. In a press for curing two tires in side-by-side relationship in sectional molds comprising a lower mold section for each tire, and vertically movable lifting elements extending through said lower mold sections and detachably secured to the tires therein, improved mechanism for elevating said lifting elements to strip the cured tires from their lower mold sections, said mechanism including a pair of parallel lever arms operatively connected one to each lifting element, a single operating cylinder having a piston for actuating said lever arms, and a transverse compensating shaft having its central portion universally connected to said piston and its ends universally connected to said lever arms, for permitting limited relative movement of the lever arms when actuated by said piston.

3. In a press for curing two tires in side-by-side relationship in sectional molds comprising a lower mold section for each tire, and vertically movable lifting elements extending through said lower mold sections and detachably secured to the tires therein, improved mechanism for elevating said lifting elements to strip the cured tires from their lower mold sections, said mechanism including a rocker shaft for each tire, rocker arms pivotally connecting said rocker shafts to said lifting elements, a pair of parallel lever arms secured one to each rocker shaft, a thrust element for actuating said lever arms, and a transverse compensating shaft having its central portion universally connected to said thrust element and its ends universally connected to said lever arms, for permitting limited relative movement of the lever arms when actuated by said thrust element.

4. In a press for curing two tires in side-by-side relationship in sectional molds comprising a lower mold section for each tire, and vertically movable lifting elements extending through said lower mold sections and detachably secured to the tires therein, improved mechanism for elevating said lifting elements to strip the cured tires from their lower mold sections, said mechanism including a pair of parallel lever arms operatively connected one to each lifting element, a thrust element for actuating said lever arms, and a transverse compensating shaft having its central portion universally connected to said thrust element and its ends universally connected to said lever arms, for permitting limited relative movement of the lever arms when actuated by said thrust element.

5. In a press for curing two tires in side-by-side relationship in sectional molds comprising a lower mold section for each tire, means to support an extensible diaphragm within each mold for curing a tire around the diaphragm, and vertically movable lifting elements extending through the lower mold section and attached to said diaphragm supporting means, improved mechanism for elevating said lifting elements to strip the cured tires from their lower mold sections, said mechanism including a rocker shaft for each tire, rocker arms pivotally connecting said rocker shafts to said lifting elements, a pair of parallel lever arms secured one to each rocker shaft, a single operating cylinder having a piston for actuating said lever arms, and a transverse compensating shaft having its central portion universally connected to said piston and its ends universally connected to said lever arms, for permitting limited relative movement of the lever arms when actuated by said piston.

6. In a press for curing two tires in side-by-side relationship in sectional molds comprising a lower mold section for each tire, means to support an extensible diaphragm within each mold for curing a tire around the diaphragm, and vertically movable lifting elements extending through the lower mold section and attached to said diaphragm supporting means, improved mechanism for elevating said lifting elements to strip the cured tires from their lower mold sections, said mechanism including a pair of parallel lever arms operatively connected one to each lifting element, a single operating cylinder having a piston for actuating said lever arms, and a transverse compensating shaft having its central portion universally connected to said piston and its ends universally connected to said lever arms, for permitting limited relative movement of the lever arms when actuated by said piston.

7. In a press for curing two tires in side-by-side relationship in sectional molds comprising a lower mold section for each tire, means to support an extensible diaphragm within each mold for curing a tire around the diaphragm, and vertically movable lifting elements extending through the lower mold section and attached to said diaphragm supporting means, improved mechanism for elevating said lifting elements to strip the cured tires from their lower mold sections, said mechanism including a pair of lever arms operatively connected one to each lifting element, a thrust element for actuating said lever arms, and a transverse compensating shaft having its central portion universally connected to said thrust element and its ends universally connected to said lever arms, for permitting limited relative movement of the lever arms when actuated by said thrust element.

8. In a press for curing two tires in side-by-side relationship in sectional molds comprising a lower mold section for each tire, means to support an extensible diaphragm within each mold for curing a tire around the diaphragm, and vertically movable lifting elements extending through the lower mold section and attached to said diaphragm supporting means, improved mechanism for elevating said lifting elements to strip the cured tires from their lower mold sections, said mechanism including a rocker shaft for each tire, rocker arms pivotally connecting said rocker shafts to said lifting elements, a pair of lever arms secured one to each rocker shaft, a thrust element for actuating said lever arms, and a transverse compensating shaft having its central portion universally connected to said thrust element and its ends universally connected to said lever arms, for permitting limited relative movement of the lever arms when actuated by said thrust element.

9. In a press for curing two tires in side-by-side relationship in sectional molds comprising a lower mold section for each tire, and vertically movable lifting elements extending through said lower mold sections for supporting the tires, improved mechanism for elevating said lifting elements to strip the cured tires from their lower mold sections, said mechanism including a pair of parallel lever arms operatively connected at one end one to each lifting element, a transverse compensating shaft having its ends pivoted in the other ends of said lever arms, and a thrust element tiltably connected to the shaft between its ends for actuating the lever arms while permitting limited relative movement thereof.

10. In a press for curing two tires in side-by-side relationship in sectional molds comprising a lower mold section for each tire, and vertically movable lifting elements extending through said lower mold sections for supporting the tires, improved mechanism for elevating said lifting elements to strip the cured tires from their lower mold sections, said mechanism including a pair of parallel lever arms operatively connected at one end one to each lifting element, a transverse compensating shaft having its ends universally journaled in the other ends of said lever arms, and a thrust element having a universal connection with said shaft intermediate its ends to permit limited relative movement of the lever arms.

11. In a press for curing two tires in side-by-side relationship in sectional molds comprising a lower mold section for each tire, and vertically movably lifting elements extending through said lower mold sections for supporting the tires, improved mechanism for elevating said lifting elements to strip the cured tires from their lower mold sections, said mechanism including a pair of parallel lever arms operatively connected at one end one to each lifting element, a transverse compensating shaft having its ends universally journaled in the other ends of said lever arms and an enlarged spherically curved portion intermediate its ends, and a thrust element for actuating said lever arms, said thrust element having a spherical socket journaling the spherical portion of said shaft and openings on either side of said socket permitting limited rocking movement of said shaft.

12. In a press for curing two tires in side-by-side relationship in sectional molds comprising a lower mold section for each tire, and vertically movable lifting elements extending through said lower mold sections for supporting the tires, improved mechanism for elevating said lifting elements to strip the cured tires from their lower mold sections, said mechanism including a pair of parallel lever arms operatively connected at one end one to each lifting element, a transverse compensating shaft having its ends movably connected to the other ends of said lever arms and an enlarged spherically curved central portion, and a thrust element for actuating said lever arms, said thrust element having a transverse bore surrounding said shaft, the central part of the bore journaling the spherically curved portion of the shaft and the remaining part of said bore being radially spaced from the shaft to allow limited tilting movement of the shaft.

References Cited in the file of this patent

UNITED STATES PATENTS

| | | |
|---|---|---|
| 2,495,663 | Soderquist | Jan. 24, 1950 |
| 2,699,572 | Soderquist | Jan. 18, 1955 |
| 2,715,245 | Soderquist | Aug. 16, 1955 |